US012602457B2

(12) United States Patent
Hobson

(10) Patent No.: US 12,602,457 B2
(45) Date of Patent: Apr. 14, 2026

(54) PREVENTING ACCIDENTAL PASSWORD DISCLOSURE

(71) Applicant: International Business Machines Corporation, Armonk, NY (US)

(72) Inventor: Stephen James Hobson, Hampton (GB)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 18/217,150

(22) Filed: Jun. 30, 2023

(65) Prior Publication Data

US 2025/0005119 A1    Jan. 2, 2025

(51) Int. Cl.
*G06F 21/31* (2013.01)

(52) U.S. Cl.
CPC .................................. *G06F 21/31* (2013.01)

(58) Field of Classification Search
CPC .......... G06F 21/31; G06F 21/45; G06F 21/60; G06F 21/83; G06F 21/30; G06F 21/32; G06F 21/6245; G06F 3/0481; H04L 9/3213; H04L 9/3226; H04L 9/3236
USPC .......................................................... 726/6
See application file for complete search history.

(56) References Cited

U.S. PATENT DOCUMENTS 6,950,949 B1 * 9/2005 Gilchrist ................. G06F 21/44
                                                    726/19
7,103,776 B1 * 9/2006 Hall ......................... G06F 21/31
                                                    455/411

7,788,498 B2 * 8/2010 Yang ....................... G06F 21/83
                                                    725/53
8,966,645 B2 * 2/2015 Low ........................ G06F 21/60
                                                    726/26
9,400,883 B2 * 7/2016 Chougle ............... H04L 63/123
9,588,595 B2 * 3/2017 Demopoulos ......... G06F 3/0233
10,708,052 B2 * 7/2020 Kominar ............... H04L 9/3236
11,762,493 B2 * 9/2023 Jung ...................... G06F 3/0416
                                                    726/7
2002/0066039 A1 * 5/2002 Dent ....................... G06F 21/31
                                                    726/5
2007/0250920 A1 * 10/2007 Lindsay .................. G06F 21/31
                                                    726/7

(Continued)

FOREIGN PATENT DOCUMENTS

EP           2921983 A1      9/2015

OTHER PUBLICATIONS

Anonymous, "Method of protection from password disclosure during interrupted/ mistaken authentication operation (i.e. by pop up window)," IP.com Prior Art Database, Technical Disclosure No. IPCOM000240725D, Feb. 23, 2015, 5 pages.

*Primary Examiner* — James N Fiorillo

(74) *Attorney, Agent, or Firm* — Zilka-Kotab, P.C.

(57) ABSTRACT

A computer-implemented method, according to one embodiment, includes: receiving a preliminary password key from a user, and in response to receiving the preliminary password, determining whether a cursor of a graphical user interface is located in a password entry field. In response to determining that the cursor of the graphical user interface is not located in the password entry field, a warning is issued to the user. Additionally, any inputs that are received from the user are discarded in response to determining that the cursor of the graphical user interface is not located in the password entry field.

20 Claims, 5 Drawing Sheets

(56) References Cited

U.S. PATENT DOCUMENTS

| | | | |
|---|---|---|---|
| 2012/0235912 A1* | 9/2012 | Laubach ............... | G06F 3/0485 345/163 |
| 2012/0246483 A1* | 9/2012 | Raisch ................. | H04L 9/3297 713/178 |
| 2013/0247156 A1* | 9/2013 | Savo ................... | G06F 21/6218 726/4 |
| 2014/0150108 A1* | 5/2014 | Low ........................ | G06F 21/60 726/26 |
| 2016/0034676 A1* | 2/2016 | Huang ................. | G06F 21/572 726/18 |
| 2016/0078216 A1* | 3/2016 | Chougle ................ | G06F 21/31 726/26 |
| 2017/0230179 A1* | 8/2017 | Mannan ................ | H04L 9/3226 |
| 2018/0248698 A1* | 8/2018 | Kominar ................ | G06F 21/45 |
| 2021/0240815 A1* | 8/2021 | Tsou ...................... | G06F 21/46 |
| 2022/0207121 A1* | 6/2022 | Singh ................. | H04L 63/1483 |
| 2023/0116273 A1* | 4/2023 | Li ......................... | G06F 3/0481 715/767 |
| 2023/0161378 A1* | 5/2023 | Zhu ........................ | G09G 5/003 345/173 |
| 2023/0185892 A1* | 6/2023 | Hughes ................ | H04L 9/0656 |
| 2023/0289440 A1* | 9/2023 | Jung ....................... | G06F 21/31 |

* cited by examiner

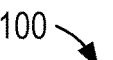
100

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

IMPROVED PASSWORD RETENTION CODE

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

Receive an entry for a password entry field from a user    402

404

Has a preliminary password key been provided?

NO

YES

406

Permit the entry to be submitted into the password entry field

408

Cause a warning to be issued

410

Discard the entry received from the user

412

Cause the warning to be deactivated

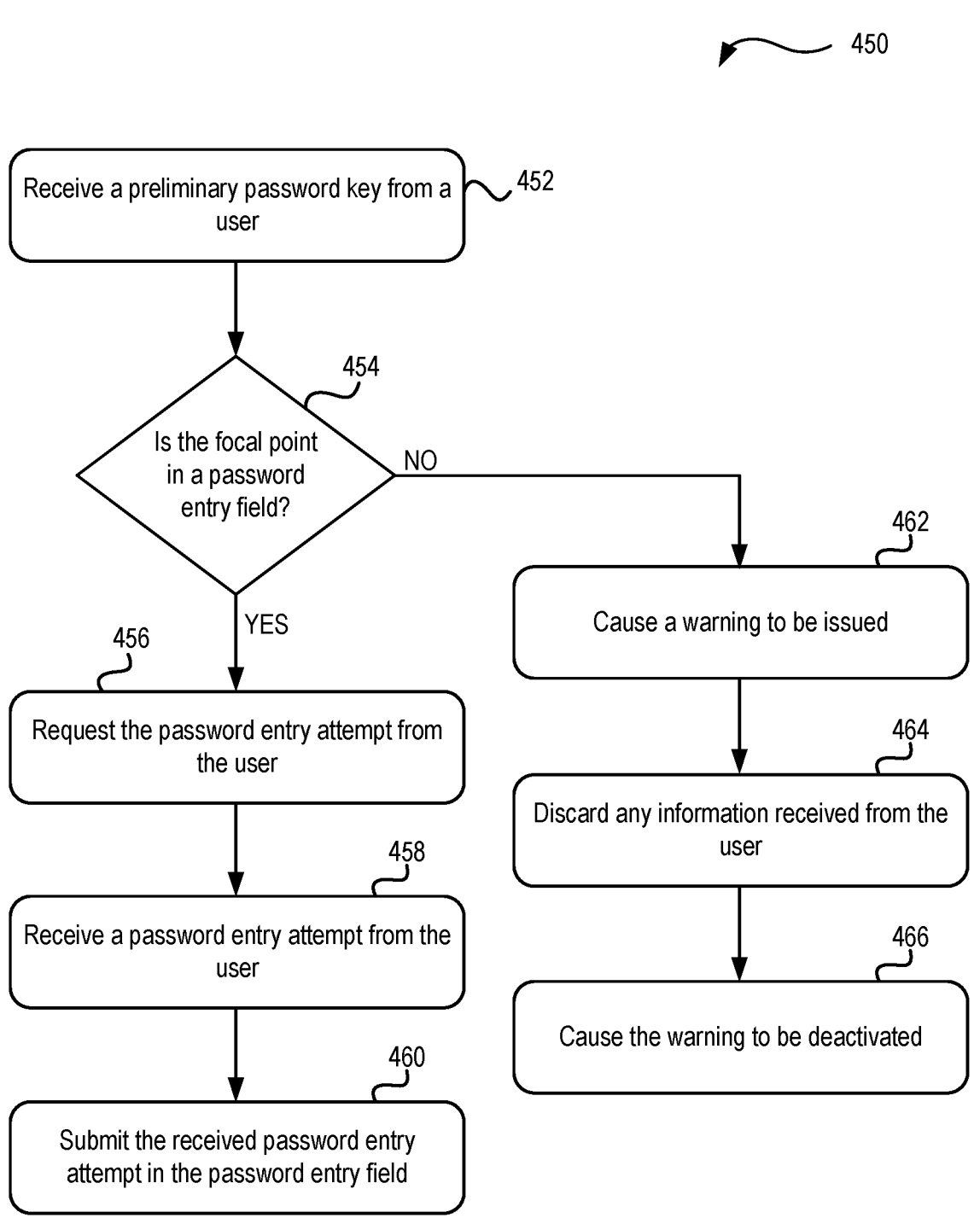

450

Receive a preliminary password key from a user ⟋ 452

454

Is the focal point in a password entry field?

NO

Cause a warning to be issued 462

Discard any information received from the user 464

Cause the warning to be deactivated 466

YES

Request the password entry attempt from the user 456

Receive a password entry attempt from the user 458

Submit the received password entry attempt in the password entry field 460

FIG. 4B

PREVENTING ACCIDENTAL PASSWORD DISCLOSURE

BACKGROUND

The present invention relates to password security measures, and more specifically, this invention relates to evaluating user performance to prevent accidental password disclosures.

As more aspects of daily life are virtualized and data storage becomes more complex, the importance of implementing effective password management has also increased. Passwords are logical keys that protect an increasing amount of information for users. Accordingly, password managers have been developed to store and manage passwords for local applications or online services such as web applications, online shops, social media, etc. While these password managers may also implement security features to protect the passwords stored therein, the passwords are often prone to exposure when being submitted. In other words, passwords are still vulnerable to exposure once removed from the password manager.

According to an example, passwords are at risk of exposure while being entered in a security check. For instance, during the security check, the user may enter a password in the wrong text field of a website, thereby resulting in the password to be shown in plain text. In another situation, a user may inadvertently enter their password in the username field of a logon window. Some login procedures store previously entered usernames, thereby causing the user's password to be stored for reuse as a previously attempted username. I still other instances, a user may inadvertently enter their password in a different window that is open, e.g., such as an instant message window as a result of switching to a different open window than intended.

It follows that users have been at risk of inadvertently exposing their passwords despite using password managers and other security software. In sharp contrast to these conventional shortcomings, implementations included herein are able to protect users against accidentally exposing their passwords and other sensitive information. Moreover, these implementations may be applied across a number of different scenarios, e.g., as will be described in further detail below.

SUMMARY

A computer-implemented method, according to one embodiment, includes: receiving a preliminary password key from a user, and in response to receiving the preliminary password, determining whether a cursor of a graphical user interface is located in a password entry field. In response to determining that the cursor of the graphical user interface is not located in the password entry field, a warning is issued to the user. Additionally, any inputs that are received from the user are discarded in response to determining that the cursor of the graphical user interface is not located in the password entry field.

A computer program product, according to another embodiment, includes a computer readable storage medium having program instructions embodied therewith. The program instructions are readable by a processor, executable by the processor, or readable and executable by the processor, to cause the processor to perform the foregoing method.

A system, according to yet another embodiment, includes: a display, a dedicated button, and a processor. The system also includes logic that is integrated with the processor, executable by the processor, or integrated with and executable by the processor. Moreover, the logic is configured to: perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment.

FIG. 4B is a flowchart of a method, in accordance with one embodiment.

DETAILED DESCRIPTION

Figure 2:
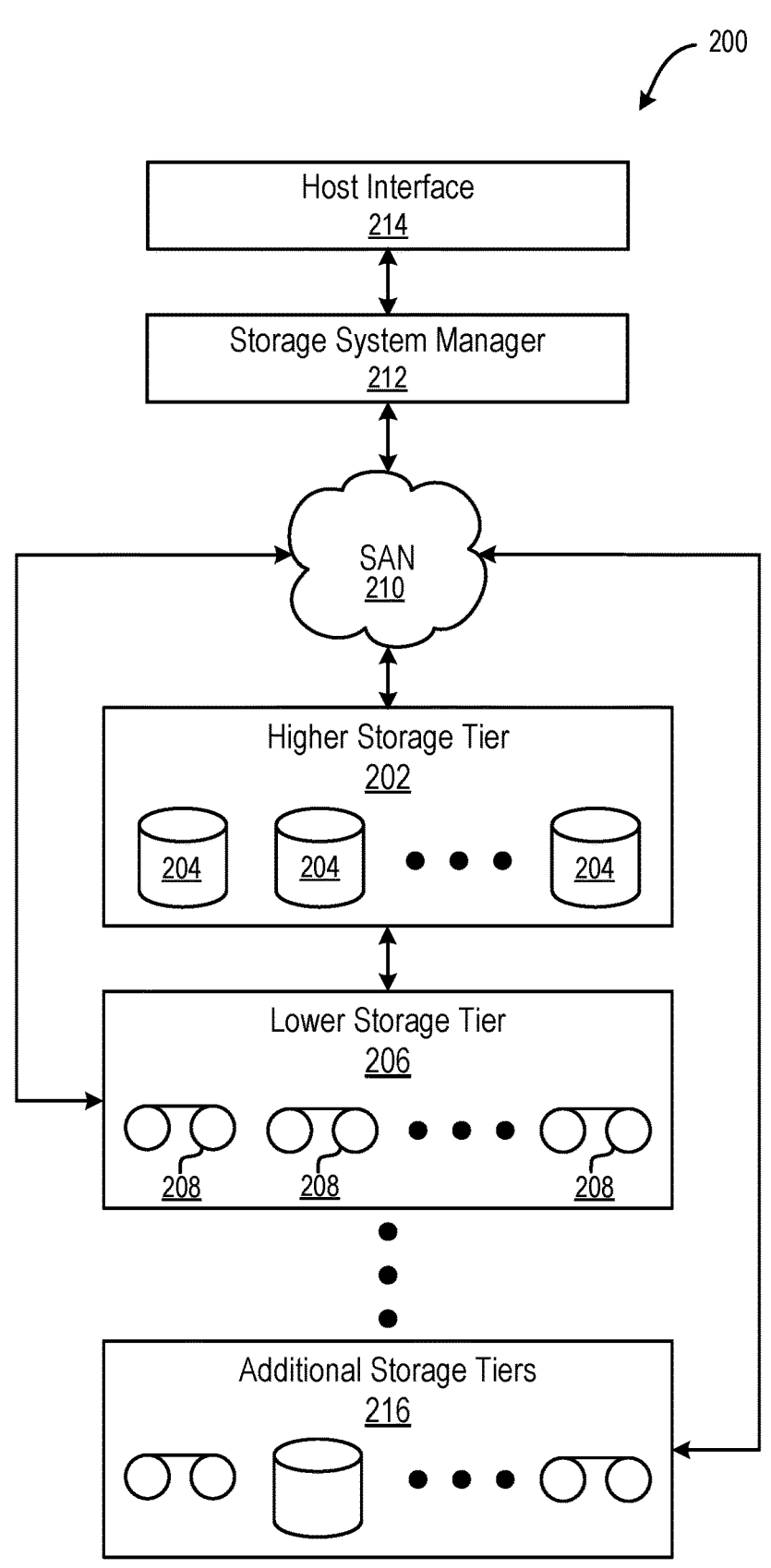
FIG. 2 is a diagram of a tiered data storage system, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for securing password entry practices of users. Accordingly, implementations herein ensure a user is intentionally entering a password attempt before they are implemented. This desirably protects users against accidentally submitting a password entry attempt and other sensitive information. Password exposures are thereby avoided, freeing the system from the computational overhead associated with reacting to a security breach caused by a password exposure. As a result, the overarching system is able to operate more efficiently while also increasing data security as a result, e.g., as will be described in further detail below.

In one general embodiment, a computer-implemented method includes: receiving a preliminary password key from a user, and in response to receiving the preliminary password, determining whether a cursor of a graphical user interface is located in a password entry field. In response to determining that the cursor of the graphical user interface is not located in the password entry field, a warning is issued to the user. Additionally, any inputs that are received from the user, and preferably all inputs that are received from the user, are discarded in response to determining that the cursor of the graphical user interface is not located in the password entry field.

In another general embodiment, a computer program product includes a computer readable storage medium having program instructions embodied therewith. The program instructions are readable by a processor, executable by the processor, or readable and executable by the processor, to cause the processor to perform the foregoing method.

In yet another general embodiment, a system includes: a display, a dedicated button, and a processor. The system also includes logic that is integrated with the processor, executable by the processor, or integrated with and executable by the processor. Moreover, the logic is configured to: perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved password retention code at block 150 which protects users against accidentally submitting password entry attempts and other sensitive information. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

Now referring to FIG. 2, a storage system 200 is shown according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

As noted above, more aspects of daily life have become virtualized and data storage more complexity has increased. This in turn has caused the importance of implementing effective password management to increase also. Passwords are logical keys that protect an increasing amount of information for users. Accordingly, password managers have been developed to store and manage passwords for local applications or online services such as web applications, online shops, social media, etc. While these password managers may also implement security features to protect the passwords stored therein, the passwords are often prone to exposure when being submitted. In other words, passwords are still vulnerable to exposure once removed from the password manager.

According to an example, passwords are at risk of exposure while being entered in a security check. For instance, during the security check, the user may enter a password in the wrong text field of a website, thereby resulting in the password to be shown in plain text. In another situation, a user may inadvertently enter their password in the username field of a logon window. Some login procedures store previously entered usernames, thereby causing the user's password to be stored for reuse as a previously attempted username. In still other instances, a user may inadvertently enter their password in a different window that is open, e.g., such as an instant message window as a result of switching to a different open window than intended.

It follows that users have been at risk of inadvertently exposing their passwords despite using password managers and other security software. In sharp contrast to these conventional shortcomings, implementations included herein are able to protect users against accidentally exposing their passwords and other sensitive information. Moreover, these implementations may be applied across a number of different scenarios, e.g., as will be described in further detail below.

Figure 3:
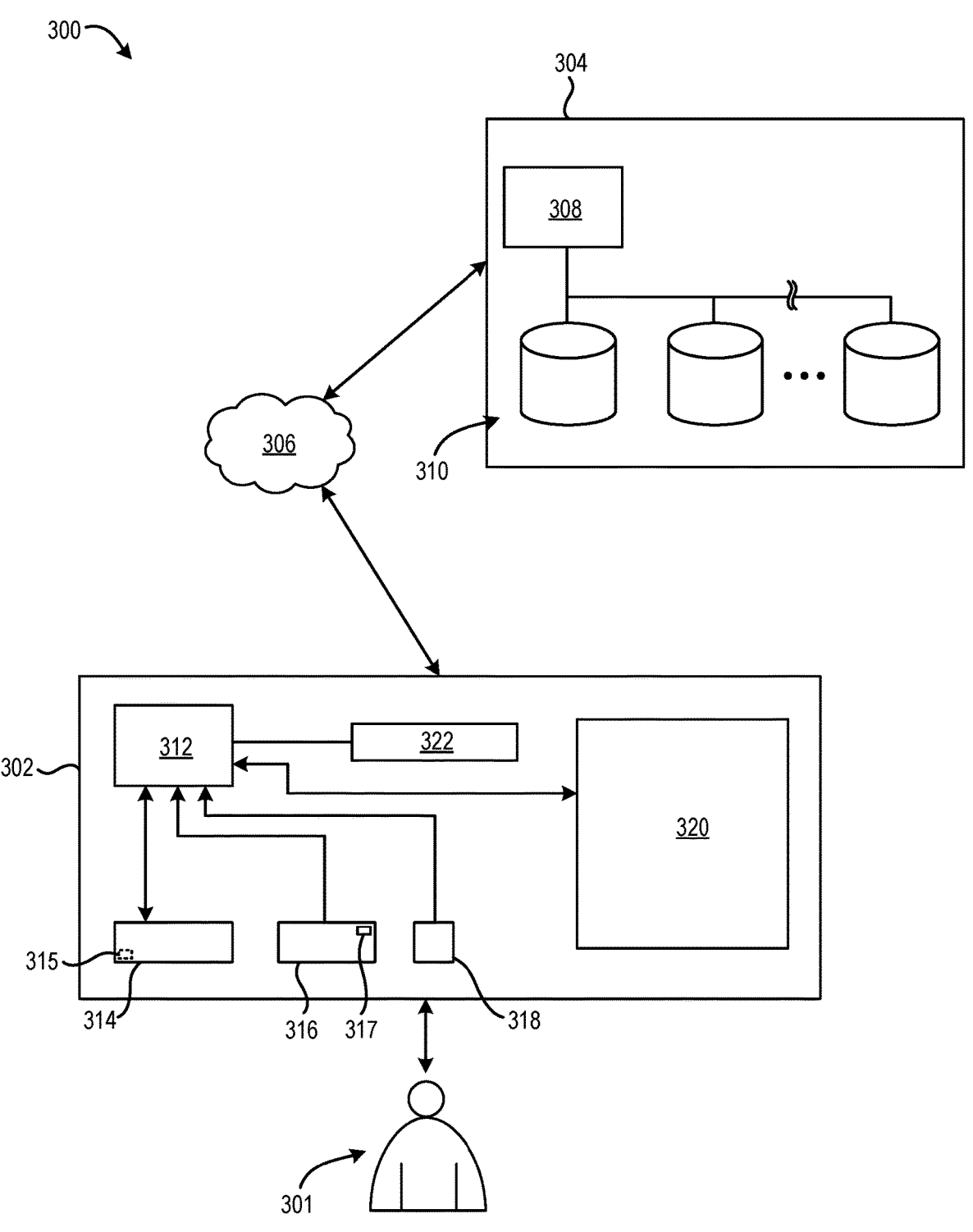
FIG. 3 is a diagram of a compute system, in accordance with one embodiment.

Referring now to FIG. 3, a compute system 300 is illustrated in accordance with one embodiment. As an option, the present compute system 300 may be implemented in conjunction with features from any other embodiment listed herein, such as those described with reference to the other FIGS., such as FIG. 1. However, such compute system 300 and others presented herein may be used in various applications and/or in permutations which may or may not be specifically described in the illustrative embodiments listed herein. Further, the compute system 300 presented herein may be used in any desired environment. Thus FIG. 3 (and the other FIGS.) may be deemed to include any possible permutation.

As shown, compute system 300 includes a local computer module 302 that is connected to a remote compute location 304 (e.g., remote server) over a network 306. As a result, any desired information, data, commands, instructions, responses, requests, etc. may be sent between computer module 302 and remote compute location 304.

The network 306 may be of any type, e.g., depending on the desired approach. For instance, in some approaches the network 306 is a WAN, e.g., such as the Internet. However, an illustrative list of other network types which network 306 may implement includes, but is not limited to, a LAN, a PSTN, a SAN, an internal telephone network, etc. Accordingly, the module 302 and location 304 are able to communicate with each other regardless of the amount of separation which exists therebetween, e.g., despite being positioned at different geographical locations.

It should also be noted that computer module 302 and remote compute location 304 may be connected differently depending on the approach. For example, the computer module 302 and remote compute location 304 may be located relatively close to each other and connected by a wired connection, e.g., a cable, a fiber-optic link, a wire, etc., or any other type of connection which would be apparent to one skilled in the art after reading the present description.

Remote compute location 304 includes a processor 308 coupled to memory 310. The remote compute location 304 may thereby be able to process data, implement instructions, issue requests, satisfy commands, etc. The remote compute location 304 may be configured differently to provide different functionality. According to examples, which are in no way intended to limit the invention, the remote compute location 304 may include a cryptographic module (not shown) that allows the remote compute location 304 to produce encrypted data, a data compression module (not shown) that allows the remote compute location 304 to produce compressed data, etc.

Returning to computer module 302, a central processor 312 is coupled to a number of components that form a computer interface for a user 301. For instance, the central processor 312 is coupled to a display screen 314, a physical keyboard 316, and a computer mouse 318. The central processor 312 may thereby be configured to receive inputs from the keyboard 316 and computer mouse 318 as entered by the user 301. These inputs typically correspond to information presented on the display screen 314 when the entries were received. Moreover, the inputs received from the keyboard 316 and computer mouse 318 may impact the information shown on display screen 314, data stored in memory 320, status of an operating system being implemented by processor 312, etc.

The display screen 314 is shown as further including a logical button 315. The logical button 315 is preferably visible to a user (e.g., see user 301) on the display screen 314 and selectable by the keyboard 316 and/or computer mouse 318 as part of a password entry process, e.g., as will be described in further detail below. The keyboard 316 further includes a dedicated physical button 317 that is available to a user. The physical button 317 may be identified as corresponding to the password entry process by markings that distinguish the surface from a remainder of the keyboard. In other words, a key on the keyboard may be marked with an indication that differentiates it from a remainder of the standard keyboard keys. This physical button 317 may be activated (e.g., pressed) as part of a password entry process, again which is described in further detail below.

It should also be noted that the display screen 314, the keyboard 316, and the computer mouse 318 are each coupled directly to the processor 312 in the present implementation. Accordingly, inputs received from the keyboard 316 and/or computer mouse 318 may be evaluated before being implemented in the operating system and/or shown on display screen 314. For example, the central processor 312 may perform any one or more of the operations described below in methods 400, 450 of FIGS. 4A-4B in order to improve password entry practices of users.

Referring still to FIG. 3, the central processor 312 is also coupled to a password management module 322. The password management module 322 may include a secure storage location configured to accumulate different passwords. The passwords are preferably protected in the module 322 to avoid exposure. For instance, the passwords themselves may be password protected, stored in an encrypted form, stored in read-only format, etc. It follows that the password management module 322 may be queried in order to satisfy a password entry request, e.g., as would be appreciated by one skilled in the art after reading the present description.

As noted above, although a password management module may organize and protect existing passwords while not in use, the act of entering a password into a prompt puts the password in risk of exposure. This is true even when entered from a vault. For example, a password may unintentionally be entered in a username field of a login prompt and even be saved in memory as such. In another example, the password could mistakenly be entered in a different open window. Accordingly, the central processor 312 is preferably able to exchange information with the password management module 322, in addition to implementing the operations of method 400 of FIG. 4A.

Figure 4A:
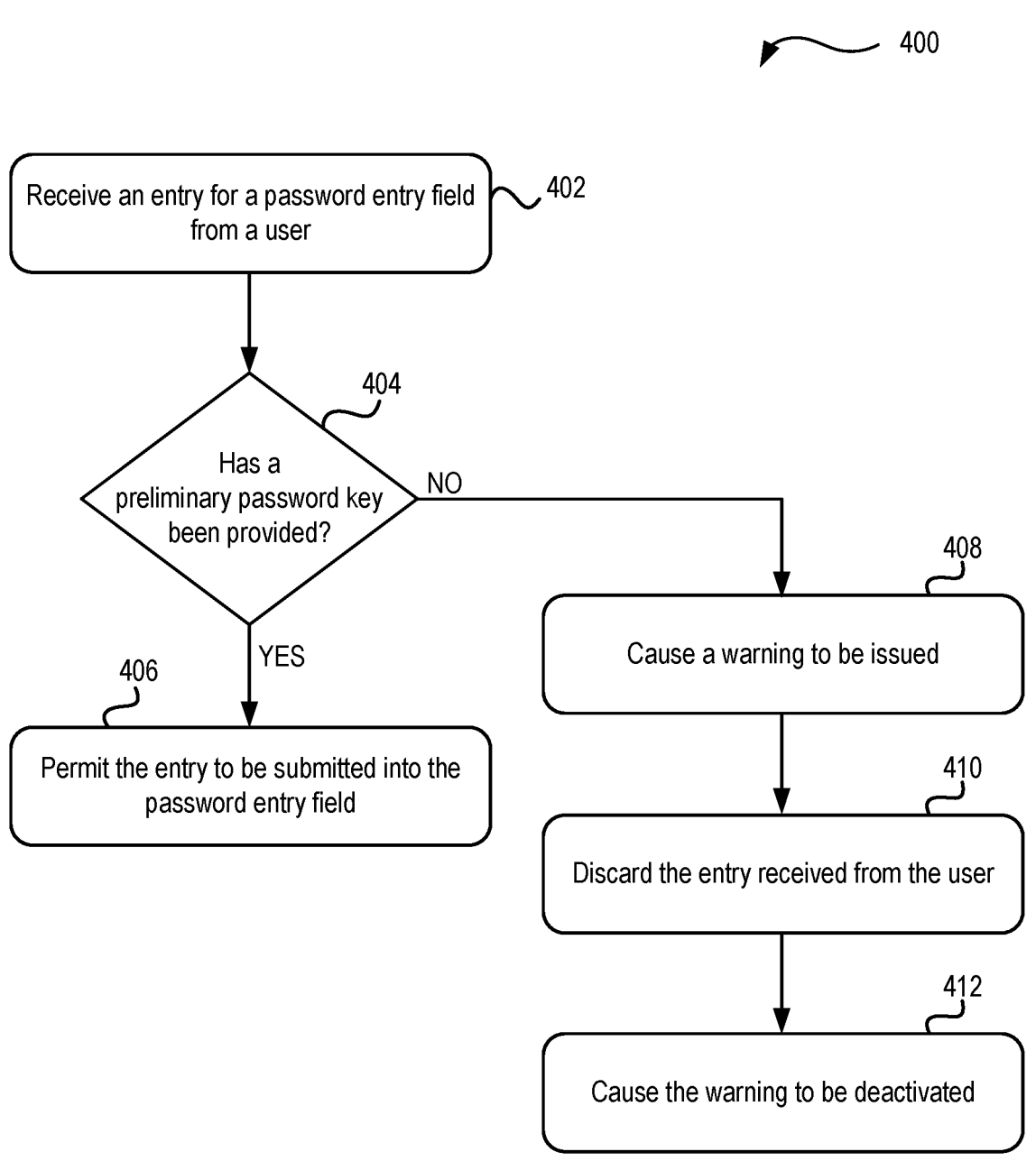
FIG. 4A is a flowchart of a method, in accordance with one embodiment.

Looking to FIG. 4A, a method 400 for securing password entry practices of users is shown according to one embodiment. The method 400 may be performed in accordance with the present invention in any of the environments depicted in FIGS. 1-3, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment using known techniques and/or techniques that would become readily apparent to one skilled in the art upon reading the present disclosure. For example, method 400 may be performed by a central controller in response to powering on, in response to a user opening a web browser, etc., or in other situations that involve a user's passwords being more at risk. In various other embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, operation 402 of method 400 includes receiving an entry for a password entry field from a user. Styles of password entry fields vary, and therefore a password entry may differ depending on the implementation. For example, the size (amount of data) of a password may vary. Moreover, password entries received from a password manager may include corresponding metadata. Passwords may also be entered in sequential portions, as a single block of information, in a pattern, etc. It follows that the type of "entry" received in operation 402 differs depending on a number of factors. However, operation 402 may include receiving at least a first character of a password (e.g., a unique combination of characters).

Similarly, the entry may be received from different locations. In some situations, the password may be received from a password management module (e.g., see module 322 of FIG. 3), while in other situations the password may be received directly from the user through an electromechanical interface, e.g., such as a keyboard, a computer mouse, a biometric reader, etc. While information received from a password management module typically includes stored passwords, keyboards and computer mice are used for a variety of tasks, making it difficult to identify when a password is being typed on a keyboard.

Accordingly, operation 402 also involves identifying when the focal point of the operating system is in a password entry field. With respect to the present description, the "focal point" of the operating system is intended to refer to the current location of (i) a computer mouse cursor on a display and/or (ii) a text entry cursor. Accordingly, while the focal point of the operating system is in a password entry field, it may be assumed that any information entered by a user includes a password.

It should also be noted that a "password entry field" may include any portion of a graphical user interface (GUI) that is currently programmed as non-display. In other words, a password entry field includes any portion of a GUI that is programmed to not display the alphanumeric characters that correspond to information entered. In some approaches, password entry fields include sections of the GUI that are programmed to display masking dots in place of any characters entered by a user. It follows that password entry fields work to actively hide details about information entered therein by a user. This is to be distinguished from "dead" sections of a display or GUI that simply do not respond to user input, e.g., as would be appreciated by one skilled in the art after reading the present description.

Accordingly, in response to receiving an entry (e.g., information) from a user to submit, and identifying that the current focal point of the operating system is in a password entry field, method 400 proceeds from operation 402 to operation 404. There, operation 404 includes determining whether a preliminary password key has been provided by the user. The preliminary password key effectively serves as a precursor for the user being able to submit a password in a password entry field. Thus, in approaches implementing a preliminary password key, users will be unable to submit information in password entry fields without first providing the key, e.g., as will be described in further detail below.

The preliminary password key may be implemented differently to acknowledge entry of a password, e.g., depending on the desired approach. For instance, in some approaches the preliminary password key corresponds to a logical button shown on a display as part of a GUI. In other approaches, the preliminary password key corresponds to a physical button (e.g., pushbutton) that is activated upon being indented by a user, indicating a password may be entered. In some implementations, the button is activated while held in a recessed (e.g., compressed) position. In other words, the preliminary password key may be provided while the physical button is physically kept in an intended position by the user, thereby allowing a password attempt to actually be entered.

While this provides added security by decreasing the chances of a password being inadvertently exposed, other implementations may value a more streamlined approach. For instance, other implementations involve simply pressing the physical button prior to entering a password. Some implementations may determine whether a dedicated keyboard key has been pressed immediately before the password attempt begins (e.g., before any other actions are made and/or keys are pressed). In other implementations, activating the dedicated key may start an internal timer, during which password attempts are permitted to be entered in password entry fields.

The timer may be set to a predetermined amount of time that corresponds to a current security setting of the system. For example, a more secure security setting may reduce the amount of time a password attempt may be submitted to a password entry field following activation of a physical button. In comparison, a less secure security setting may increase the amount of time a password attempt may be submitted following activation of a physical button. In still other approaches, providing different preliminary password keys (e.g., pressing a different combination of keyboard keys) corresponds to different amounts of time a password attempt may be submitted following activation of the respective physical button(s). Thus, different users may automatically experience different password entry settings (e.g., levels of security) based on the preliminary password key they provide.

As noted above, this dedicated key may be pressed and held down while a password is entered in some instances. In other approaches, the physical button may actually be a specific combination of traditional keys on a computer keyboard. For example, activating the physical button may involve a user physically pressing two or more keys on a keyboard at the same time, in a specific sequence, in response to a prompt being provided, etc., to indicate that the preliminary password key has been provided. Other types of electromechanical components may be used to indicate the preliminary password key has been provided in other approaches, e.g., such as toggle switches, pushbuttons with two or more selectable states, removable fuses, etc. It follows that the term "physical button" is in no way intended to be limiting.

As noted above, in some approaches the preliminary password key is provided in response to a logical button being activated by the user. The logical button is preferably shown on the display screen such that the user has access while interacting with the GUI of the operating system. Moreover, the logical button may be a dedicated logical button such that the sole function of the logical button is to provide the preliminary password key in response to the logical button being activated. It follows that a "dedicated button" as used herein may refer to a dedicated physical button (e.g., a unique key on a computer keyboard), or a dedicated logical button (e.g., a unique logical button shown on a display), e.g., as would be appreciated by one skilled in the art after reading the present description. In other approaches, the logical button may be configured to receive more than one input, each input corresponding to a different action performed in response. is It follows that the logical button may be activated by a user in response to selecting the logical button through a GUI with a computer mouse cursor; physically touching a portion of a display screen configured as a touch screen with a finger, stylist, etc.; typing in a command using a computer keyboard, etc.

Moreover, the logical button may appear on the display screen in response to certain conditions being met in some implementations. For example, the logical button may appear in a corner of the display screen in response to a user opening a web browser. Moreover, the logical button may remain in the corner of the display screen while the web browser is open. In some instances, the logical button may actually be integrated into the interface of the web browser. In other implementations, the logical button may appear on the display screen and remain while a password entry field is shown (present) on the display screen. In other words, a password entry field may be detected in response to it appearing on the display screen, causing the logical button to appear in response to detecting the password entry field.

It follows that some approaches include a physical button as well as a logical button that is displayed. This allows a user to provide the preliminary password key as a result of activating either type of button, e.g., depending on which is more convenient, preferred, etc. However, in other approaches only one type of button may be available to activate. For instance, some implementations may only include a logical button present (e.g., shown) on a display, while other implementations only include a physical button (e.g., a dedicated keyboard key) available to activate. In still other implementations, the logical button may be selectively activated (e.g., turned on) by a user, as desired.

Returning to operation 404, method 400 is shown as proceeding to operation 406 in response to determining that the preliminary password key has been provided. As noted above, the preliminary password key may be provided a number of different ways. Accordingly, operation 404 may inspect more than one source of preliminary password keys. For example, operation 404 may include determining whether a physical button has been pressed, in addition to determining whether a logical button has been activated. In some implementations, a password attempt may be entered only in response to activating both logical and physical buttons.

Looking to operation 406, there method 400 includes permitting the entry to be submitted into the password entry field. Determining whether the preliminary password key has been provided helps ensure password entries are intentional and being submitted to the correct prompt. In other words, situations where a password entry is accompanied by a preliminary password key are more likely to be authentic and intentional, compared to situations in which only a password entry is received.

Accordingly, returning to operation 404, method 400 proceeds to operation 408 in response to determining a preliminary password key has not been provided. In other words, method 400 proceeds to operation 408 in response to determining a physical button and/or a logical button have not been activated by the user. Operation 408 includes causing a warning to be issued. The warning is preferably issued such that the user is notified of the situation before unintentionally exposing details of their password information. It follows that in some implementations, the warning may be issued continually until the user acknowledges the risk. In some instances, the warning may even increase in volume, repeat with a shrinking period, be combined with other warnings, etc. In other implementations, the warning may be turned off, muted, etc., after a predetermined amount of time has passed.

It follows that the warning is preferably issued in a way that alerts the user in real-time. In some approaches, issuing the warning includes emitting an audible sound from a speaker located at the user's location. For instance, one or more instructions may be sent to a speaker in the user's computer, which plays (emits) one or more sounds configured to alert the user of a potential password exposure. In other approaches, the warning includes a visual warning which may suddenly appear on a display of the user's computer. The visual warning may also be present on the display for a period of time that overlaps at least a portion of an audible warning.

From operation 408, method 400 proceeds to operation 410 which includes discarding the entry originally received at operation 402. In other words, operation 410 includes erasing any information received such that the entry (password attempt) is not even entered into the password entry field. This improves the security of the implementations herein by protecting against keystroke loggers and similar types of software that can compromise a password being entered in a text field, despite never actually submitting the characters entered in the field.

The entry originally received at operation 402 is preferably discarded such that the entry itself, and any metadata associated with the entry (e.g., number of characters, presence of a capital letter, etc.), are inaccessible. For instance, the original entry may be erased from a cache and any operations performed on the original entry may also be erased from memory. The amount of information discarded in operation 410 may depend on the desired level of security. As noted above, some implementations may desire a more secure password protection architecture. Such implementations may thereby discard (e.g., irreversibly erase) as much information about an inadvertent password entry attempt.

As noted above, the warning is preferably issued such that the user is notified of the situation before unintentionally exposing details of their password information. It follows that in some implementations, the warning may be issued continually until the user acknowledges the risk. While different actions may be taken in situations where the user does not acknowledge the potential password exposure (e.g., the warning increases in volume), the warning may be deactivated in situations where the user does acknowledge the potential password exposure. Accordingly, operation 412 includes causing the warning to be deactivated in response to receiving an acknowledgement from the user. The acknowledgement can vary in type depending on the implementation, but may involve the user pressing a predetermined key on a computer keyboard to cancel the entry (e.g., escape key), providing the preliminary password key to confirm a password entry is intended, clearing any password information copied to cache (e.g., a temporary clipboard), etc.

It follows that the operations of method 400 are able to ensure password entry attempts are intended before they are implemented. As noted above, this desirably protects users against accidentally submitting a password entry attempt and other sensitive information, by identifying password entry fields and monitoring the user's actions. Password exposures are thereby avoided, freeing the system from the computational overhead associated with reacting to a security breach caused by a password exposure. As a result, the overarching system is able to operate more efficiently while also increasing data security.

In similar situations, the user may indicate a password entry attempt by preemptively providing the preliminary password key. Accordingly, a preliminary password key may be compared against whether a password entry field is detected as being available to the user. For example, method 450 of FIG. 4B is for securing password entry practices of users according to one embodiment. The method 450 may be performed in accordance with the present invention in any of the environments depicted in FIGS. 1-3, among others, in various embodiments. Of course, more or less operations than those specifically described in FIG. 4B may be included in method 450, as would be understood by one of skill in the art upon reading the present descriptions.

Each of the steps of the method 450 may be performed by any suitable component of the operating environment using known techniques and/or techniques that would become readily apparent to one skilled in the art upon reading the present disclosure. For example, method 450 may be performed by a central controller in response to powering on, in response to a user opening a web browser, etc., or in other situations that involve a user's passwords being more at risk. In various other embodiments, the method 450 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 450. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4B, operation 452 of method 450 includes receiving a preliminary password key from a user. As noted above, a preliminary password key may be different depending on the given approach. For instance, the preliminary password key may be a signal produced in response to a user activating a physical button, a logical code output in response to a user activating (e.g., selecting) a logical button, etc.

From operation 452, method 450 proceeds to operation 454. There, operation 454 includes determining whether a text entry cursor of a GUI is shown on the display as located in the password entry field. In other words, operation 454 determines whether the current focal point of the operating system is in a password entry field. As noted above, with respect to the present description, the "focal point" of the operating system is intended to refer to the current location of (i) a computer mouse cursor on a display and/or (ii) a text entry cursor. In one example, the focal point of the operating system may be determined as being in a password entry field in situations where typing alphanumeric characters on a computer keyboard without performing any preliminary actions (e.g., orienting a computer mouse, clicking a computer mouse, pressing a "Tab" key on a computer keyboard, etc., and/or combinations thereof) will result in those alphanumeric characters being entered in a password entry field. However, it should be noted that these characters may not be directly visible to the user upon being entered into the password entry field. For example, the password entry field may implement masking dots to increase the security of the password being entered.

In response to determining that the focal point is located in the password entry field, method 450 proceeds to operation 456. There, operation 456 includes requesting the password entry attempt from the user. Moreover, operation 458 includes receiving a password entry attempt from the user, while operation 460 includes submitting the received password entry attempt in the password entry field.

Returning to operation 454, method 450 proceeds directly to operation 462 in response to determining that the current focal point of the operating system is not in a password entry field. As shown, operation 462 includes causing a warning to be issued to the user, while operation 464 includes discarding any information (e.g., inputs) received from the user. Furthermore, operation 466 includes causing the warning to be deactivated in response to receiving an acknowledgement from the user. It should be noted that any one or more of operations 462, 464, 466 may include any aspects of operations 408, 410, 412 described above with respect to FIG. 4A, e.g., as would be appreciated by one skilled in the art after reading the present description.

Accordingly, method 450 (e.g., like method 400) is able to ensure a user is intentionally entering a password attempt before they are implemented. As noted above, this desirably protects users against accidentally submitting a password entry attempt and other sensitive information, by evaluating current settings in response to receiving an indication from the user that a password attempt is intended to be made. Password exposures are thereby avoided, freeing the system from the computational overhead associated with reacting to a security breach caused by a password exposure. As a result, the overarching system is able to operate more efficiently while also increasing data security as a result of implementing method 450 and various other implementations herein.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
in response to receiving a preliminary password key from a user, determining whether a dedicated button has been activated by the user;
in response to determining that the dedicated button has been activated by the user, determining whether a cursor of a graphical user interface is located in a password entry field; and
in response to determining that the cursor of the graphical user interface is not located in the password entry field:
causing a warning to be issued to the user, and
preemptively discarding, from memory: the preliminary password key, and any inputs received from the user, before they appear in the graphical user interface,
wherein preemptively discarding the preliminary password key and any inputs received from the user includes irreversibly erasing the preliminary password key and any inputs received from the user from the memory.

2. The computer-implemented method of claim 1, comprising:
in response to determining that the cursor of the graphical user interface is located in the password entry field and that the dedicated button remains activated by the user, permitting any inputs received from the user to be inserted in the password entry field.

3. The computer-implemented method of claim 2, wherein issuing a warning to the user includes emitting an audible sound, wherein issuing a warning to the user includes presenting a visual warning on a display.

4. The computer-implemented method of claim 2, wherein preemptively discarding the preliminary password key and any inputs received from the user, from the memory includes:
irreversibly erasing the preliminary password key and the input(s) received from the user from cache before the graphical user interface is updated.

5. The computer-implemented method of claim 1, further comprising:
in response to determining that the dedicated button has not been activated by the user:
causing the warning to be issued to the user, and
preemptively discarding, from memory: the preliminary password key, and any inputs received from the user, before they appear in the graphical user interface.

6. The computer-implemented method of claim 5, wherein the dedicated button is a dedicated physical key on a physical keyboard, wherein the dedicated physical key is activated while held in a recessed position.

7. The computer-implemented method of claim 1, wherein the dedicated button is a logical button visible to the user on a display, wherein the password entry field is visible to the user on the display.

8. The computer-implemented method of claim 1, comprising:
in response to receiving an entry for the password entry field from the user, determining whether the preliminary password key has been provided by the user;
in response to determining that the preliminary password key has been provided by the user, permitting the entry to be submitted into the password entry field; and
in response to determining that the preliminary password key has not been provided by the user:
causing the warning to be issued to the user, and
discarding the entry.

9. The computer-implemented method of claim 1, wherein the password entry field includes any portion of the graphical user interface programmed as non-display, wherein the memory is cache.

10. A computer program product, comprising a computer readable storage medium having program instructions embodied therewith, the program instructions readable by a processor, executable by the processor, or readable and executable by the processor, to cause the processor to:
in response to receiving a preliminary password key from a user, determine whether a dedicated button has been activated by the user;
in response to determining that the dedicated button has been activated by the user, determine whether a cursor of a graphical user interface is located in a password entry field; and
in response to determining that the cursor of the graphical user interface is not located in the password entry field:
cause a warning to be issued to the user, and preemptively discard, from memory: the preliminary password key, and any inputs received from the user, before they appear in the graphical user interface, wherein preemptively discarding the preliminary password key and any inputs received from the user includes irreversibly erasing the preliminary password key and any inputs received from the user from the memory.

11. The computer program product of claim 10, wherein the program instructions are readable and/or executable by the processor to cause the processor to:

in response to determining that the dedicated button has not been activated by the user:

cause the warning to be issued to the user, and preemptively discard, from memory: the preliminary password key, and any inputs received from the user, before they appear in the graphical user interface.

12. The computer program product of claim 11, wherein the dedicated button is a dedicated physical key on a physical keyboard, wherein the dedicated physical key is activated while held in a recessed position.

13. The computer program product of claim 10, wherein the program instructions are readable and/or executable by the processor to cause the processor to:

cause the warning to be deactivated in response to receiving an acknowledgement from the user.

14. The computer program product of claim 13, wherein issuing a warning to the user includes emitting an audible sound, wherein issuing a warning to the user includes presenting a visual warning on a display.

15. The computer program product of claim 10, wherein the program instructions are readable and/or executable by the processor to cause the processor to:

in response to determining that the cursor of the graphical user interface is located in the password entry field and that the dedicated button remains activated by the user, permitting any inputs received from the user to be inserted in the password entry field.

16. The computer program product of claim 15, wherein the password entry field includes any portion of the graphical user interface programmed as non-display, wherein the dedicated button is a dedicated physical key which remains activated while held in a recessed position.

17. The computer program product of claim 10, wherein the dedicated button includes a logical button visible on a display and a physical key on a physical keyboard, wherein the dedicated button is activated in response to the physical key being depressed and the logical button being selected simultaneously, wherein the password entry field is visible on the display.

18. The computer program product of claim 10, wherein the program instructions are readable and/or executable by the processor to cause the processor to:

in response to receiving an entry for the password entry field from the user, determine whether the preliminary password key has been provided by the user;

in response to determining that the preliminary password key has been provided by the user, permit the entry to be submitted into the password entry field; and in response to determining that the preliminary password key has not been provided by the user:

cause the warning to be issued to the user, and discard the entry.

19. A system, comprising:

a display;

a dedicated button;

a processor; and logic integrated with the processor, executable by the processor, or integrated with and executable by the processor, the logic being configured to:

in response to: receiving a preliminary password key from a user, and determining that a dedicated button has been activated by the user, determine whether a cursor of a graphical user interface is located in a password entry field; and in response to determining that the cursor of the graphical user interface is not located in the password entry field:

cause a warning to be issued to the user, and preemptively discard, from memory, the preliminary password key and any inputs received from the user before they appear in the graphical user interface, wherein preemptively discarding the preliminary password key and any inputs received from the user includes irreversibly erasing the preliminary password key and any inputs received from the user from the memory.

20. The system of claim 19, wherein the logic is configured to:

in response to determining that the dedicated button has been activated by the user, permit the entry to be submitted into the password entry field; and in response to determining that the dedicated button has not been activated by the user:

cause the warning to be issued to the user, and preemptively discard the entry before it appears in the graphical user interface by irreversibly erasing the inputs received from the user from the memory.

* * * * *